United States Patent Office 3,428,457
Patented Feb. 18, 1969

3,428,457
ANIMAL FOOD COMPOSITION
Harold D. Hutchinson, Quincy, Ill., assignor to Moorman Manufacturing Company, Quincy, Ill., a corporation of Illinois
No Drawing. Filed Dec. 7, 1964, Ser. No. 416,583
U.S. Cl. 99—2            11 Claims
Int. Cl. A23k 1/02

ABSTRACT OF THE DISCLOSURE

A palatable nutriment for control of iron deficiency anemia in swine, which includes from 20% to 80% by weight of sphagnum moss, from 5% to 20% by weight of an edible humectant and an iron supplying ingredient in a quantity sufficient to furnish said composition with an iron content of at least 0.05% by weight in a form capable of being absorbed by the swine.

---

This invention relates to a fortified livestock nutriment and, more particularly, to an oral iron-sphagnum moss preparation for control of iron deficiency anemia in suckling pigs.

Iron deficiency anemia is a common nutritional problem encountered in raising young pigs which is responsible for reduced weaning weights and, in extreme cases can result in loss of the pigs from secondary causes attributable to nutritional anemia. The problem arises since sow's milk, normally the sole source of nourishment during the critical stage of pig development from farrowing to about four weeks of age, is unable to supply the iron requirements of the young pigs. Various means of supplementing the mineral intake of the suckling pigs have been proposed, however, up until now none of these have been entirely satisfactory. For example, one of the older techniques was to dig up clumps of sod and place them where the young pigs could eat them. Such a method of prevention is not acceptable to present swine husbandry practices because the iron content of the soil is usually unknown and feeding sod may constitute a hazard in the spread of internal parasites and infectious diseases.

Another technique for furnishing the suckling pigs with a supplemental iron supply has involved swabbing the udder of the sow with ferrous sulfate. This technique has been objected to because it is laborious, disturbing to the pigs, and sometimes dangerous to personnel.

Other proposed solutions have involved the injection of iron-dextran solutions and the oral administration of iron salts such as by forcing capsules down the throats of the young pigs. Obvious disadvantages of these methods are the expense and difficulty of administration. Despite these problems, however, the current standard treatment among swine farmers is to inject an iron-dextran solution into each baby pig.

Another approach to this problem has been to feed the pigs mixtures containing humus and mineral salts. Due to the physical characteristics of humus, these mixtures are dry and powdery and, accordingly, are not as palatable to the young pigs as they should be in order to stimulate consumption in quantities sufficient to prevent or fully overcome their nutritional deficiencies. Attempts to resolve this undesirable characteristic by the addition of even small amounts of humectants such as molasses and corn syrup result in the mixture having a soupy consistency, making it more difficult to dispense and less desirable as a food product for livestock. These mixtures also have another serious disadvantage in that when they are mixed with these humectants they become moldy in a relatively short time.

It is, therefore, a principal object of the present invention to provide a new and improved nutriment which is free from the disadvantages of the above-mentioned prior art techniques for overcoming iron deficiencies in suckling pigs.

Another object of the present invention is to provide a fortified feed mixture for control of iron deficiency anemia in baby pigs which is unusually palatable to these animals.

A further object of the present invention is to provide an oral iron product for control of iron deficiency anemia in baby pigs which employs a carrier having unusual moisture absorption and retention qualities enabling the product to maintain for extended periods of time an overall consistency which is attractive to the young pigs.

A still further object of the present invention is to provide a palatable nutriment for suckling pigs, comprising sphagnum moss carrier and an iron providing substance such as ferrous sulfate which substantially increases the weaning weight of these animals and reduces mortality arising as a result of nutritional deficiencies. Desirably the composition also contains a humectant such as molasses and also a trace mineral mixture.

A yet further object of the present invention is to provide a dietary supplement for control of iron deficiency anemia in baby pigs which, by itself, is able to raise the hemoglobin content of the blood of the baby pigs to a value at least as great as that obtained through hypodermic injection techniques.

Another object of the present invention is to provide a dietary supplement employing a carrier which retards the development of bacteria and fungus growth and therefore does not become moldy or deteriorate during ordinary shelf life.

A yet further object of the present invention is to provide a dietary supplement employing a carrier which can be combined with substantial quantities of humectants such as molasses and corn syrup without becoming soupy in consistency and which is highly palatable by young animals.

Still another important object of the invention is the use of sphagnum moss as a carrier for various animal food substances or nutrients such as ferrous sulfate or other iron-supplying compounds or trace mineral mixtures.

Other and further objects of the present invention will become apparent from the following detailed explanation of a preferred embodiment of the invention.

In developing the dietary supplement of the present invention, numerous combinations of ingredients were tried, including various soil, humus and feed mixtures. It was discovered that these mixtures broke down physically and quickly lost their moisture content and became unattractive to young pigs. The problem therefore involved not only finding ingredients which were effective in satisfying the nutritional requirements of the suckling pigs, but also those which retained a high moisture content. Further, since the pigs developed this anemic condition shortly after farrowing, it was necessary that the over-all product be palatable to them at a very early age (i.e. from the time they are two or three days old). As evidenced by the test results obtained with the feed product of the present invention, applicant has produced a dietary supplement which has proved to be unusually successful in controlling iron deficiency anemia in baby pigs. This product, an iron-sphagnum moss mixture, is able to produce weight gains and raise the hemoglobin content of the pig's blood to values as great as those obtainable by any of the previously known methods including that of injecting each of the pigs with an iron-dextran solution.

In accordance with the present invention the dietary supplement includes a sphagnum moss carrier which is a very absorptive fibrous material characterized by a cellular construction enabling it to hold up to twenty times its own weight in moisture. Sphagnum moss is found in north temperate regions of the world and generally has a moisture content of from 30–60 percent, usually around 45 percent on a weight basis.

While the weight percentage of sphagnum moss to product will vary in accordance with the composition and character of the other ingredients, it has been found that a range of 20 to 80 percent by weight on an "as is" basis provides a food product which is highly palatable to young pigs 2 or 3 days old. In this connection, a preferred composition containing around 55% sphagnum moss has been advantageously employed in a feed product which was unusually palatable to the young pigs.

The cellular construction of the sphagnum moss results in the over-all mixture having a spongy texture found to be attractive to suckling pigs. In this connection, it was discovered that sphagnum moss is palatable to pigs which are 2 or 3 days old. Sphagnum moss was also found to be effective in retarding bacterial and fungus growth in nutrients made therewith, a feature of special importance in food preparations required to have adequate shelf life. In this regard, it is believed that the sphagnum moss as it is used in the present invention is effective in retarding the development and growth of pathogenic bacteria, fermentation bacteria and coli bacteria in products made therewith.

As used in the specification and claims, the term "sphagnum moss" is also intended to cover certain types of "peat moss" which exhibit the same desirable properties referred to above in describing sphagnum moss. These properties include a vegetable fibre cellular construction enabling the "peat moss" to have a high degree of moisture absorption and retention, and an ability to retard or inhibit bacterial and fungus growth in a product made therewith. It should be noted, however, that only certain peat moss exhibits these desirable characteristics.

The livestock feed preparation of the present invention also includes an edible humectant. Blackstrap molasses and corn sugar molasses worked particularly well in combination with the sphagnum moss, however, it will be appreciated that other humectants possessing similar characteristics of viscosity and digestibility may be suitably employed such as, corn syrups and the like. Ranges for the humectants will of course vary with the character of the sphagnum moss and other ingredients. A range of 5 to 20 percent humectant (on an "as is" basis) to total weight of the mixture was advantageously used, with the specific ratio of between three and four parts sphagnum moss to each part of molasses producing a soft spongy textured feed. In this connection, it is significant to mote that when humectants such as molasses are added to soil or humus in amounts of around 15 percent by weight, a soupy mixture results which is unpalatable to young pigs and becomes moldy in a few days.

It was observed that palatability to young pigs was increased by the addition of a sweetener. A sugar such as cane sugar or beet sugar or other sweetening agents such as glucose or dextrose can be suitably employed. In formulating the product, it was observed that a sweetener composition range of from 5 to 30 percent, by weight on an "as is" basis produced the best results.

The iron supplying ingredient used in the formulation of the present invention should be in a form which is readily utilized by the young pigs. For example, ferrous sulfate has been found suitable for use with suckling pigs, however, other iron salts such as iron carbonate, iron gluconate, iron ammonium citrate, iron fumarate and the like may be employed. It will, of course, be appreciated, that the sphagnum moss-molasses mixture of the present invention may be used with ingredients which supply other mineral and vitamin requirements of the animals.

In combating iron deficiency anemia in young pigs it was discovered that best results were obtained with feed mixtures containing at least 0.05% by weight, of iron in the combined form. On the other hand, with an iron content of around 4 percent there did not appear to be any significant increase in body weight or hemoglobin content of the blood. It should be pointed out, however, that products containing in excess of three percent iron were tested without any toxic effects being noted. The one to three percent iron range was supplied by a five to fifteen percent ferrous sulfate content, respectively. Equivalent ranges for other iron-supplying ingredients will be apparent to those skilled in the art.

In addition to the above ingredients, it has been found advantageous to add trace quantities of copper sulfate to the sphagnum moss-molasses mixture, since this ingredient assists in the assimilation of iron. Ranges of from 0.05 of 0.1 percent, by weight, of copper sulfate have been suitably employed.

Similarly, a suitable trace mineral mixture furnishing copper, magnesium, manganese, zinc, iron, cobalt and iodine, while also not being essential to the invention, was advantageously used therewith. In this regard, weight percentages of trace mineral mixtures totalling approximately 0.05% were found to be suitable in feeding suckling pigs. Trace mineral mixtures for feeds are available commercially from several sources.

A specific embodiment of the present invention which proved to be unusually effective in treating iron deficiency anemia in suckling pigs had the following composition (this mixture, hereinafter referred to as Preparation A, was prepared by first mixing all of the dry ingredients and then adding the molasses):

| Ingredient: | Parts by weight, pounds |
|---|---|
| Ferrous sulfate | 10.0 |
| Trace mineral mixture [1] | 0.05 |
| Sphagnum moss | 55.0 |
| Cane sugar | 20.0 |
| Molasses | 15.0 |
| Total | 100.05 |

[1] Furnishing Cu, Mg, Mn, Zn, Fe, Co and I.

Preparation A is desirably light or bulky. For example, one handful will weigh approximately 3 oz.

In testing the effectiveness of the above listed iron-sphagnum moss preparation, a series of five experiments were run involving the injection of iron dextran solutions, both with and without the feeding of Preparation A. The pigs were started on the preparation from the time that they were three days of age until they were about five weeks old. The injections were usually given at the time they were three days old and supplied a level of 100 mg. iron per pig.

The pigs were weighed at the end of three weeks and again at weaning. As is indicated in the tabulation of data below, this weaning age varied from roughly 34 to 42 days. Hemoglobin determinations were made on blood samples taken from the anterior vena cava when the pigs reached three to four weeks of age. An Evelyn photoelectric colorimeter was used and the specific method that which is described in the manual accompanying this instrument (supplied by Rubicon Company of Philadelphia, Pa.).

In the following tables when reference is made to feeding a certain amount of Preparation A (e.g. 2 oz. Prep. "A"/litter/day) this is intended to indicate that the stated amount of Preparation A is made available to the litter on a free choice basis. Ordinarily the stated amount will not be fully consumed by a litter even if it is a large one containing as many as 15 animals. However, the efficiency of the preparation is of such a high order that even a very minor amount thereof will supply the iron requirements of even large litters.

SUMMARY OF HEMOGLOBIN AND GAIN DATA FROM ALL EXPERIMENTS IN WHICH THE IRON-SPHAGNUM MOSS MIXTURE (PREPARATION "A") WAS USED

| Experiment Number | Treatment | Hemoglobin (g./100 ml. blood) | 3-week Weight (lb.) | Weaning Weight (lb.) | Weaning Age (Days) |
|---|---|---|---|---|---|
| I | { No dietary, supplement or injection | 9.0 | 12.2 | 30.0 | 42 |
|   | { Armidexan [1] injection only | 11.5 | 12.5 | 32.0 | 42 |
|   | { Armidexan and 2 oz. Prep "A"/litter/day | 13.1 | 12.1 | 32.3 | 42 |
|   | { 2 oz. Prep. "A"/litter/day | 12.2 | 12.4 | 31.7 | 42 |
| II | { No dietary supplement or injection | 8.8 | 12.2 | 22.0 | 36 |
|    | { Armidexan injection | 11.7 | 13.2 | 24.1 | 36 |
|    | { Armidexan plus 2 oz. Prep. "A"/litter/day | 12.4 | 12.4 | 22.1 | 36 |
|    | { 2 oz. Prep. "A"/litter/day | 12.2 | 12.5 | 22.4 | 36 |
|    | { Armidexan plus 6 oz. Prep. "A"/litter twice weekly | 12.7 | 13.0 | 22.6 | 36 |
|    | { 6 oz. Prep. "A"/litter twice weekly | 12.6 | 13.3 | 23.7 | 36 |
| III | { No dietary supplement or injection | 5.9 | | | |
|     | { Armidexan injection only | 7.8 | (No weights taken) | | |
|     | { 2 oz. Prep. "A"/litter/day | 10.9 | | | |
| IV | { No dietary supplement or injection | 9.3 | 10.9 | 16.2 | 34 |
|    | { Armidexan injection only | 10.9 | 11.5 | 17.6 | 34 |
|    | { Armidexan plus 2 oz. Prep. "A"/litter/day | 11.9 | 11.4 | 19.6 | 34 |
|    | { 2 oz. Prep. "A"/litter/day | 11.4 | 11.4 | 19.1 | 34 |
|    | { Armidexan plus 6 oz. Prep. "A"/litter twice weekly in Creep Area | 12.0 | 11.0 | 18.0 | 35 |
|    | { 6 oz. Prep. "A"/litter/twice weekly in Creep Area | 12.2 | 10.6 | 16.5 | 35 |
|    | { Armidexan plus 6 oz. Prep. "A"/litter twice weekly in sow pen | 12.6 | 11.7 | 18.8 | 35 |
|    | { 6 oz. Prep. "A"/litter twice weekly in sow pen | 12.1 | 10.7 | 17.9 | 35 |
| V | { No dietary supplement or injection | 7.7 | 11.8 | 19.4 | 34 |
|   | { Armidexan injection only | 10.8 | 12.7 | 21.5 | 34 |
|   | 6 oz. Prep. "A" (0.5% Fe)/litter twice weekly | 10.2 | 12.8 | 21.2 | 34 |
|   | 6 oz. Prep. "A" (2.0% Fe)/litter twice weekly | 11.3 | 11.5 | 19.8 | 34 |
|   | 6 oz. Prep. "A" (4.0% Fe)/litter twice weekly | 10.5 | 12.4 | 20.3 | 34 |

[1] Armidexan is an iron-dextran complex marketed by Armour Veterinary Laboratories, Kankakee, Illinois.
NOTE.—Brackets indicate pigs in treatments were littermates.

Referring to the tabulated data, Experiment I was run to show a comparison between an iron-sphagnum moss mixture containing two percent iron (identical to Preparation A) and iron-dextran injections.

Experiment II was conducted to compare the feeding of one measure (approximately two ounces) of Preparation A given daily (total of 14 ounces per litter per week) with three measures of Preparation A given twice each week (total of 12 ounces per litter). In this regard, it should be noted that six ounces of Preparation A given twice weekly to the suckling pigs resulted in hemoglobin values which were higher than those produced by an iron-dextran injection.

Experiment III comprised a field test on a farm and was run to determine the effect on blood hemoglobin values of giving either an iron-dextran injection, no injection or dietary supplement, or the iron-sphagnum moss preparation (Preparation A) daily. As indicated by the average hemoglobin values, the administration of two ounces of Preparation A per litter per day produced a higher hemoglobin content than was obtained with the iron-dextran injection alone.

Experiment IV had a plurality of objectives which were as follows: (1) to compare the effects on blood hemoglobin values and growth rate from giving either an iron-dextran injection or allowing the pigs to have access to Preparation A; (2) to compare the results obtained from giving the pigs two ounces per litter daily of Preparation A with those obtained from giving six ounces per litter twice each week (total of twelve ounces per litter); and, (3) to compare the results from putting Preparation A in the creep area with those obtained by putting Preparation A in the sow pen. In the latter case, both the sow and litter had access to Preparation A.

In Experiment V, test comparisons were made between three iron-sphagnum moss mixtures containing 0.5 percent, 2 percent and 4 percent iron, the 2 percent mixture being identical to Preparation A, and other mixtures being identical to the composition of Preparation A except for the different ferrous sulfate concentrations.

The results of these experiments illustrate the unusual advantages of the iron-sphagnum moss preparation of the present invention. As is shown, weight gains and increases in hemoglobin content of the blood were obtained which were at least as good as those obtainable through the use of the current standard procedure of iron-dextran injections. Of particular interest are the following:

(1) Six ounces per litter of the iron-sphagnum moss mixture containing 2 percent iron and given on a twice weekly basis (total of 12 ounces per litter per week) to suckling pigs resulted in hemoglobin values that were higher than those produced by an iron-dextran injection containing 100 mg. of iron.

(2) The combination of iron-dextran injections and the iron-sphagnum moss mixture of Preparation A gave substantially the same hemoglobin values as did the feeding of Preparation A alone.

(3) Feeding the pigs two ounces per litter of the iron-sphagnum moss mixture on a daily basis did not produce higher hemoglobin values than six ounces per litter on a twice weekly basis.

(4) An increase in the iron content of the iron-sphagnum moss mixture from 2 to 4 percent did not increase hemoglobin values. In this regard, it should be noted that the product containing 4 percent iron was not found to be toxic.

(5) In situations where creep areas are not available, the iron-sphagnum moss preparation can be fed with good results by placing it on the floor in the sow pen area.

(6) All of the tests show that weaning weights are increased by iron treatments.

On the basis of these data, it is apparent that six ounces of a dietary supplement prepared in accordance with this invention can be given on a twice weekly basis to each litter and, as such, will produce highly satisfactory results, fully overcoming any nutritional inadequacies of the sow's milk. It is suggested that in feeding these iron-magnesium moss preparations, the pigs should be started when they are three days of age and continued until when they are about five weeks old, at which time they normally will be eating substantial amounts of creep ration.

The unusual success of this iron-sphagnum moss dietary supplement is primarily due to the appeal which the product has to young pigs. This appeal is, in part, due to the characteristics of sphagnum moss to absorb and retain unusual quantities of humectant to provide a palatable soft spongy texture which does not become dry, dusty or moldy. In addition, the action of sphagnum moss as an inhibitor against the development of bacterial and fungus growth in the product make it particularly suitable for use in feeding very young animals such as suckling pigs.

While Preparation A is a preferred mixture, certain changes may be made therein. For example, the molasses and/or the sugar may be omitted. The trace mineral mixture may also be varied or omitted in accordance with the requirements of the animals to be fed. Similarly, other iron supplying compounds may be used such as the iron salts mentioned above.

The advantageous properties of sphagnum moss which enable it to serve as a uniquely desirable carrier for iron compounds can also be used with other substances or nutriments. In this connection, it should be appreciated that sphagnum moss can be effectively used with other minerals and vitamins for supplying other dieary requirements of animals.

It will be appreciated that various other modifications of the compositions suggested and described in this specification will be apparent to those skilled in the art without departing from the spirit and scope of this invention. Accordingly, it is my intention that this invention be limited only by the scope of the appended claims.

I claim:

1. A nutriment for controlling iron deficiency anemia in suckling pigs comprising from 20% to 80% by weight of sphagnum moss and an iron-supplying ingredient present in a quantity to furnish at least about 0.05% available iron based on the weight of the nutriment.

2. A nutriment for control of iron deficiency anemia in swine, comprising from 20% to 80% by weight of sphagnum moss, from 5% to 20% by weight of an edible humectant, and an iron-supplying ingredient in a quantity sufficient to furnish said nutriment with an iron content of at least 0.05% by weight in a form capable of being absorbed by the swine.

3. The nutriment of claim 2 wherein said humectant is selected from the group consisting of blackstrap molasses, corn sugar molasses and corn syrup.

4. The nutriment of claim 2 wherein said iron-supplying ingredient is selected from the group consisting of iron sulfate, iron carbonate, iron gluconate, iron ammonium citrate, and iron fumarate.

5. A nutriment for control of iron deficiency anemia in suckling pigs comprising from 20% to 80% by weight of sphagnum moss, from 5% to 20% by weight of molasses, a sweetener content of at least 5% by weight, said sweetener being selected from the group consisting of sucrose, glucose and dextrose, and an iron-supplying ingredient in a quantity sufficient to furnish said nutriment with an iron content of at least 0.05% by weight.

6. The nutriment of claim 5 wherein said iron-supplying ingredient has an iron content of from 0.05% to 4.0% by weight.

7. A dietary supplement for control of iron deficiency anemia in suckling pigs, comprising: approximately 55% by weight of sphagnum moss; 15% by weight of an edible humectant selected from the group consisting of blackstrap molasses, corn sugar molasses and corn syrup; 20% by weight of a sweetener selected from the group consisting of sucrose, glucose and dextrose; and, 10% by weight of an iron-supplying ingredient selected from the group consisting of iron sulfate, iron carbonate, iron gluconate, iron ammonium citrate and iron fumarate.

8. The dietary supplement of claim 7 wherein trace quantities of copper sulfate are added.

9. The method of controlling iron deficiency anemia in suckling pigs which comprises feeding the suckling pigs a highly palatable dietary supplement which comprises from 20% to 80% by weight of sphagnum moss, and an iron-supplying ingredient in a quantity sufficient to provide said dietary supplement with an iron content of at least 0.05% by weight in a form capable of being absorbed by the suckling pigs.

10. A method of controlling iron deficiency anemia in suckling pigs which comprises feeding the suckling pigs a nutriment composition comprising from 20% to 80% by weight of sphagnum moss, from 5.0% to 20% by weight of an edible humectant, and an iron-supplying ingredient in a quantity sufficient to furnish said nutriment with an iron content of at least 0.05% by weight in a form capable of being absorbed by suckling pigs.

11. A method of controlling iron deficiency anemia in suckling pigs which comprises feeding the suckling pigs a nutriment composition comprising from 20% to 80% by weight of sphagnum moss, from 5.0% to 20% by weight of an edible humectant, at least about 5% by weight of a solid sweetener, and an iron-supplying ingredient in a quantity sufficient to furnish said nutriment with an iron content of at least 0.05% by weight in a form capable of being absorbed by suckling pigs.

References Cited

UNITED STATES PATENTS

| | | | |
|---|---|---|---|
| 776,959 | 12/1904 | Joehnk et al. | 99—6 |
| 2,926,085 | 2/1960 | Geerlings | 99—2 |
| 3,259,500 | 7/1966 | Barnhart | 99—2 |

RAYMOND N. JONES, *Primary Examiner.*

J. M. HUNTER, *Assistant Examiner.*

U.S. Cl. X.R.

99—6

UNITED STATES PATENT OFFICE
CERTIFICATE OF CORRECTION

Patent No. 3,428,457  February 18, 1969

Harold D. Hutchinson

It is certified that error appears in the above identified patent and that said Letters Patent are hereby corrected as shown below:

Column 3, line 54, "mote" should read -- note --. Column 6, line 71, "magnesium" should read -- sphagnum --. Column 7, line 23, "dieary" should read -- dietary --. Column 8, line 46, "776,959" should read -- 776,595 --.

Signed and sealed this 14th day of April 1970.

(SEAL)
Attest:

Edward M. Fletcher, Jr.
Attesting Officer

WILLIAM E. SCHUYLER, JR
Commissioner of Patents